Nov. 10, 1953 — H. L. AMMANN — 2,658,821
APPARATUS FOR PRODUCING CARBON BLACK
Filed Oct. 26, 1950 — 3 Sheets-Sheet 1

Inventor
HERMAN L. AMMANN
By F. R. Jenkins
Attorney

Nov. 10, 1953 H. L. AMMANN 2,658,821
APPARATUS FOR PRODUCING CARBON BLACK
Filed Oct. 26, 1950 3 Sheets-Sheet 2
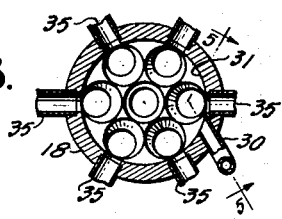
FIG. 3.
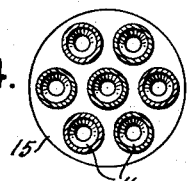
FIG. 4.
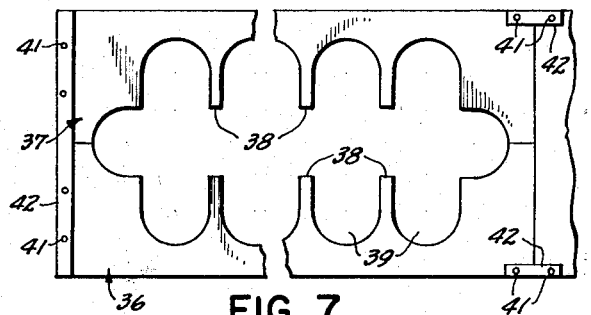
FIG. 7.
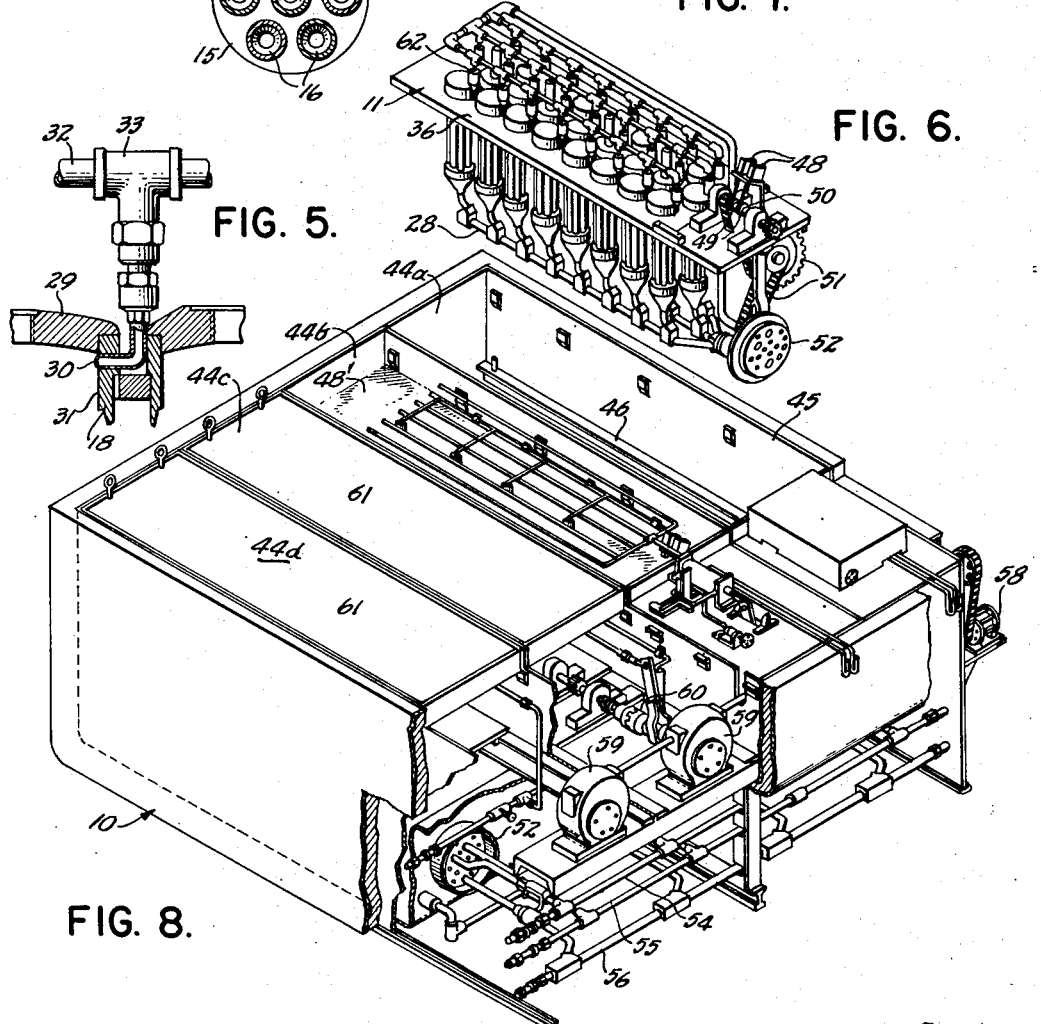
FIG. 5.
FIG. 6.
FIG. 8.
Inventor
HERMAN L. AMMANN
By F. R. Jenkins
Attorney

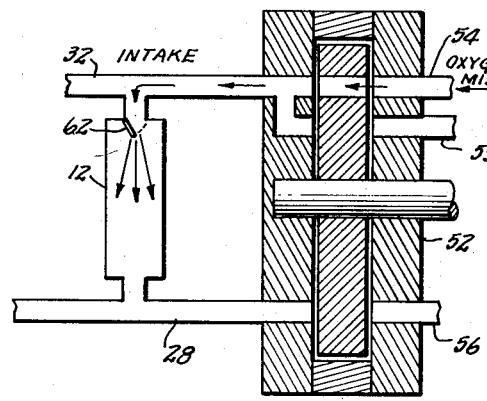
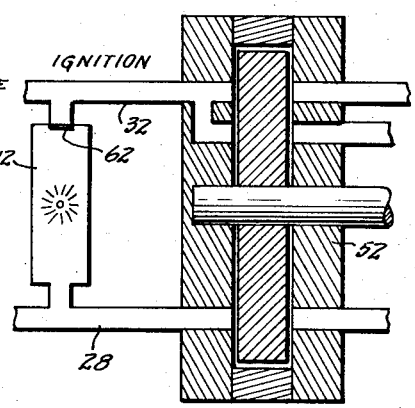
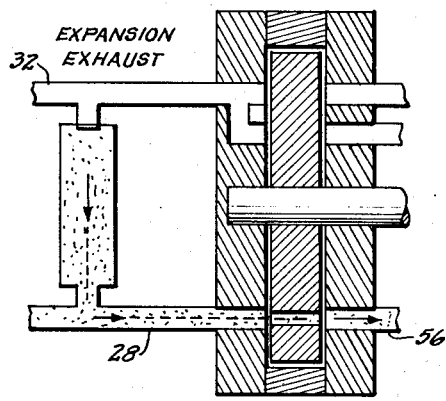
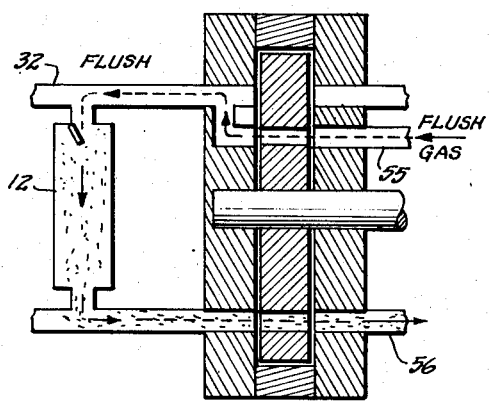
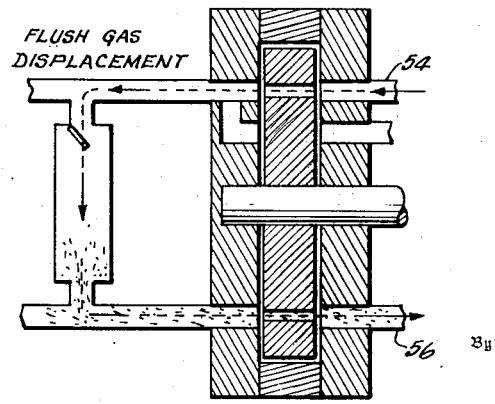

Patented Nov. 10, 1953

2,658,821

UNITED STATES PATENT OFFICE 2,658,821

APPARATUS FOR PRODUCING CARBON BLACK

Herman L. Ammann, Madison, N. J.

Application October 26, 1950, Serial No. 192,327

2 Claims. (Cl. 23—259.5)

In the production of carbon black from hydrocarbons by the explosion process it is known that the size of the reaction or explosion chamber affects the quantity of yield in some way and it has been thought that this is due to the presence of a relatively large surface on which the partial combustion occurs.

It is an object of this invention to provide an apparatus and system for operating same so that the explosions may be carried out under controlled conditions whereby a large reaction surface is provided and yet there will be a minimum of "dead gas spaces" or pockets where the carbon is formed.

I have found that in the operation of explosion chambers for the production of carbon black it is necessary for the explosion products to be flushed or purged as completely as possible after each explosion not only to obtain a high yield but to obtain a product of uniform particle size, especially when the product must be, on an average, of about 10 millimicrons and less.

Not only is it necessary to provide a reaction chamber which will contain no dead pockets but it is also necessary that the chamber structure be so constructed that it can be readily taken apart and cleaned or repaired.

It has been found that the expansion of exhaust gases alone is not sufficient to sweep the chamber of all freshly formed carbon after each explosion within the chamber. An object of the present invention is to provide a method or system of operation in which a relatively inert i. e. non-explosive, gas is used to flush the explosion chamber after each explosion, thereby sweeping out the major portion of any carbon just formed.

This flushing or purging may be accomplished by the introduction of a more or less pure hydrocarbon gas into the explosion chamber. Since the exhaust gases derived from the explosion of hydrocarbons (especially when pure oxygen is used but also when air is used) have a high calorific value, the exhaust gases are good fuel gases and may be sold or used as such. Consequently the eventual mixing of flush gas with the exhaust or "spent" gases is not desirable since the resulting mixture has a heat content of about 50–75% of the original hydrocarbon when the mixture contains about equal volume of spent gases and flush gas.

To obtain these objects I employ a plurality of multi-tubed reactors or chambers which are connected in parallel to form what I term a process or operating unit. A number of such units all of practically identical construction are operated in a sequence so as to insure a more or less regular rate of carbon production as well as avoiding irregular drains on the raw materials. After each explosion a flush gas sweeps out carbon that has lingered in the reactor or chamber after the exhaust phase.

In the accompanying drawing showing, by way of example, one of many possible embodiments of the invention, Fig. 1 is a fragmental longitudinal vertical sectional view, partly in elevation, showing the reactors, the section being taken substantially on the line 1—1 of Fig. 2, looking in the direction of the arrows of said line;

Fig. 3 is a fragmental transverse horizontal sectional view, partly in elevation, showing one of the reactors, the section being taken substantially on the line 3—3 of Fig. 1, looking in the direction of the arrows of said line;

Fig. 4 is a transverse horizontal longitudinal vertical sectional view, partly in elevation, showing one of the reactors, the section being taken substantially on the line 4—4 of Fig. 1, looking in the direction of the arrows of said line;

Fig. 5 is a fragmental vertical sectional view, partly in elevation, showing the inlet means, the section being taken substantially on the line 5—5 of Fig. 3, looking in the direction of the arrows of said line;

Fig. 6 is a perspective showing the reactors in a unit;

Fig. 7 is a fragmental plan showing mounting means of the unit;

Fig. 8 is a perspective with parts removed showing the assembly of operating units, and Figs. 9a through 9e are schematic representations of the operation of a reactor.

Figure 1:
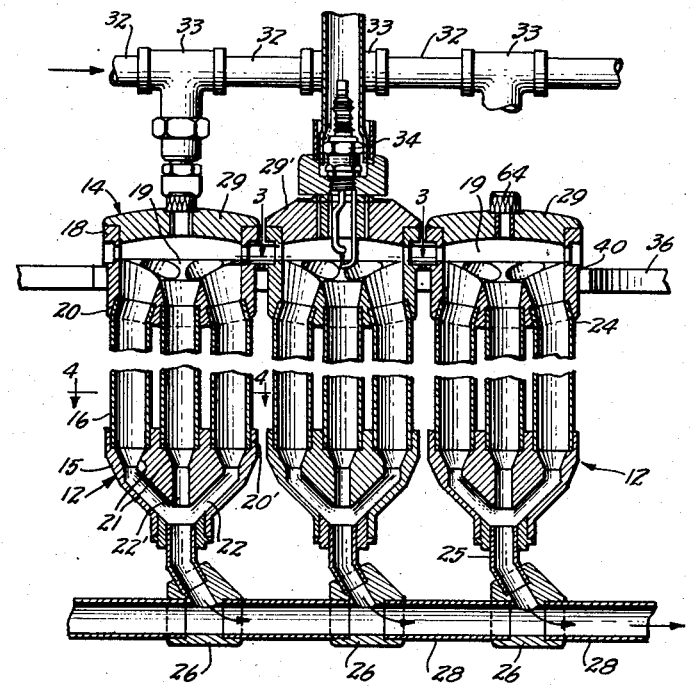

The apparatus and mode of operation are first briefly described as a machine, generally designated 10 (Fig. 8) including a number of process units generally designated 11 (Fig. 6) which are in turn made up of a plurality of more or less identical inter-connected reactors or explosion chambers 12 arranged in three rows.

In a manner described in greater detail hereinbelow, a hydrocarbon-oxygen (or hydrocarbon-air) mixture is admitted into the explosion chambers immersed in a coolant; the mixture is then ignited while under pressure and subsequently the products of explosion are allowed to expand; next a flush gas removes the products of combustion, including the remainder of the desired carbon. In the next phase more of the same mixture pushes out the flush gases and the cycle is repeated.

Each reactor 12, comprises upper and lower headers 14 and 15 of circular shape receiving seven evenly spaced vertical tubes 16 of substantially inert material having a relatively high heat conductivity such as copper or stainless steel. The upper header 14 is made up of a more or less cylindrical piece 18 having a conical recess 19 in the upper face thereof, and seven tube receiving bores 20 each flared at the face of the recess and generally directed toward the axis of the piece. All the bores are almost tangent to each other at the surface of the recess 19 and the intervening metal of the piece 18 slopes toward the center of the piece where the seventh or central bore is located. In this construction there is no horizontal ledge on which carbon may settle.

The lower header 15 is generally of conical shape having seven equally spaced vertical openings 20' receiving the tubes 16 having conical tapered portions as at 21 where they join round conduits 22 sloped at about 45° angles toward the center. The central conduit 22' is of course vertical.

The upper ends 24 of the outer tubes are inwardly slightly bent on account of the concavity of the recess 19.

The lower headers 15 in a row of reactors are all connected by conduits 25 and Y connectors 26 into an exhaust line 28.

It is noted that in all connections the various elements, be they the Y connectors, portions of the exhaust line or headers, the internal walls are all smooth and free from abrupt variations in diameter and that all joints form substantially continuous surfaces so that virtually no cracks or crevices, which may trap carbon, are present. The elements of the joints are made of copper or stainless steel with fits allowing a few thousandths of an inch tolerance and secured by brazing with silver alloy.

Each upper header 14 is capped by a round head piece 29 in the piece 18 about a half inch above the highest surfaces of the recess 19. Each header 14 is provided with an inlet duct member 30 nearly tangential to the inner vertical and cylindrical wall 31 of the piece 18 between the recess 19 and the head piece 29. The explosive and flush gases are injected into the reactor through this inlet member 30 so as to create a somewhat circular motion to the gases for distributing the gases uniformly among the several tubes and to apply a lateral force against particles of carbon in the header and so dislodge them.

The inlet members 30 are connected to a supply line or pipe 32 serving a row of the reactors preferably so that the direction of flow of the intake gases is in the same general direction as for the exhaust gases so that the pressure drop across the reactor will be uniform throughout the row, the connection is effected through union T connectors 33.

Figure 2:
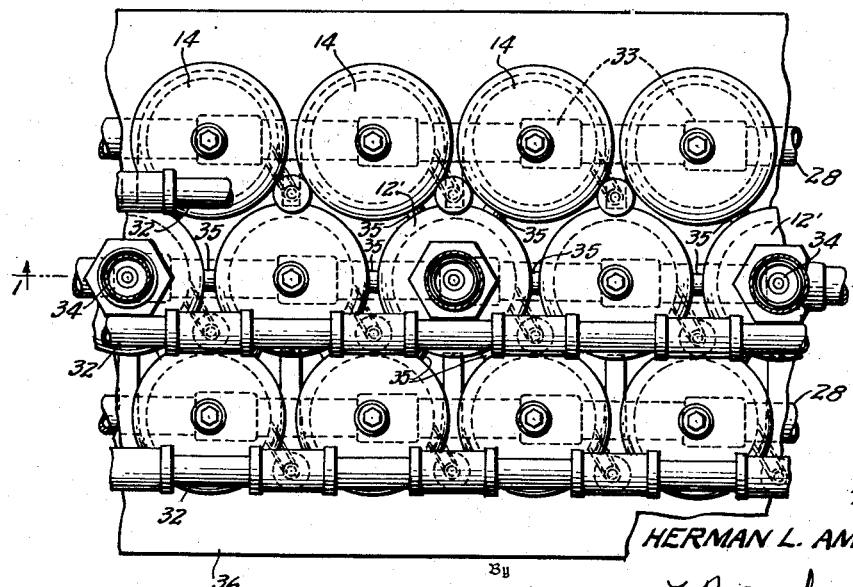
Fig. 2 is a plan showing reactors of Fig. 1.

While from a standpoint of inlet and exhaust gases the reactors are best described as being in rows, from a standpoint of ignition they are best considered as group of six (or functionally a group of seven). From an inspection of Fig. 2 it is seen that along the middle row of reactors alternate reactors are provided with a modified header cap 29' to accommodate an igniter or glow plug 34. Such reactors, termed ignition reactors and designated 12', are connected to the six nearest reactors disposed about them by conduits 35 near the recess 19. These conduits 35 are preferably connected to the reactors by brazing with silver alloy.

In assembly of the unit 11, the ignition reactor 12' and five simple reactors 12 are assembled into a group and the groups joined head-to-tail with obvious additions, if desired, at the ends of the rows. The T connectors 33 are preferably brazed to the sections of the line 32 so that disassembly can be easily effected by unsoldering the appropriate joints in the three exhaust lines and feeder lines and the connectors joining the reactors of the middle row so that a group of six reactors may be taken out together and, if desired, the broken rows be rejoined where the group was removed.

All of the reactors are preferably mounted by suspension from a longitudinally divisible platform 36 in the form of opposed combs 37 having prongs 38 between recesses 39. The reactor headers of middle row rest on the end portions of the prongs 38 at overhanging flanges 40 about the header while the headers of the outer rows rest on the marginal portions of the recesses 39. The combs 37 are secured together by suitable means such as bolts 41 and plates 42.

The machine 10, as shown, is made up of four substantially identical cells 44a, 44b, 44c and 44d with various parts of each cell removed for clarity. Each cell comprises a tank 45 having ledges therein as shown at 46 on which the platform and unit 11 rests. A coolant liquid 48', such as oil, in the tank surrounds and substantially covers the unit.

Ignition is controlled by switches 48 for energizing the glow plugs 34, it being preferable that separate current supplies be provided for alternate glow plugs to assure ignition. Generally one glow plug will not only fire its own reactor and satellite reactors, but will fire many more along the rows. Hence dual ignition will assure firing of all reactors in the unit 11. The switches 48 are actuated by cams 49 on a driven shaft 50. Through suitable sprocket and chain means 51 a cycle valve 52 (whose operation is described in Figs. 9a–9e) is rotated so as to control the flow of oxygen mixture from line 54 and flush gas from line 55 to the feeder line 32 and the exhaust is controlled to a product line 56. Carbon is removed from the contents of the product line 56 in a conventional manner as by a precipitator (not shown).

The shaft 50 and cycle valve 52 may be driven by suitable means such as a motor 58 through a speed reducer 59. It may be desirable to take one process unit 11 out at a time, in which case a disengageable coupling 60 may be employed with appropriate arrangements provided to prevent uncoupling at a time when explosion hazards would be present. The tanks may be covered by tops 61.

In operation, a hydrocarbon-oxygen or hydrocarbon-air mixture which may be enriched with oxygen is supplied to the line 54 from a suitable source, at initial pressures preferably of the order of a few atmospheres, such as from 2 to 10 atmospheres for a hydrocarbon-oxygen mixture and a correspondingly higher pressure when atmospheric nitrogen is present. The ratio of oxygen to hydrocarbon may be varied depending on the quality of carbon and the yield desired, as well as the hydrogen content of the hydrocarbon. The explosive mixtures and initial gas pressures may be similar to those described in Patent No. 2,150,790 although I prefer to use methane as the hydrocarbon, and I prefer to use an oxygen-hydrocarbon ratio of 40:60 and higher.

Figs. 9a–9e afford a schematic representation of the operating cycle. The cycle valve 52 admits the gas containing the hydrocarbon and oxygen to the chamber 12, preferably past a check valve 62 near the chamber, to fill the chamber at the above indicated initial pressure. Since cooling of the chamber inner surfaces is desirable, the gas for the supply line is preferably much higher than the initial pressure so that gas expansion will tend to cool the chamber. The confined explosive mixture is then ignited as in Fig. 9b, after which the gas products are allowed to pass, carrying carbon black, to the product line 56 as shown in Fig. 9c.

The exhaust port remains open long enough to permit flush gas to enter from the line 55 so as to positively displace the gaseous combustion products and sweep out more of the carbon, as shown in Fig. 9d. The flushing out of the carbon not only makes for greater recovery of the carbon but it tends to cool the reactor and removes the carbon before it is subjected to another explosion which would cause the carbon particles to grow. After the flushing the flush gas is largely displaced by oxygen mixture as shown in Fig. 9e where the cycle is begun again.

The flush gas may be any gas which would not of itself become ignited. However, I prefer to use a hydrocarbon such as is employed in the explosive mixture. The addition of the flush gases to the product line 56 raises the heating value of "spent" gases so that they will be suitable to supply gas engine compressors.

It is desirable to pre-mix the oxygen (or air) and hydrocarbon before admission into the chamber 12 to assure uniformity so that flame propagation will be at a maximum at oxygen concentrations which results in the best grades of carbon.

It has been found that the lower the temperature at which the chamber is kept the better is the yield of carbon. However it has also been found that if moisture is allowed to condense within the chamber (after which vapor is formed during combustion) the removal of the carbon is much more difficult. By using a dry flush gas, water vapor condensation can be prevented at much lower average operating temperatures, than when no flush gas is used. I may thus operate at an average coolant temperature as low as about 25° C. without danger of condensation though where quality is not so important the temperature may rise to 75° C. or 110° C.

The ratio of flush gas to spent gas may be increased without limit but of course the higher the ratio the lower the carbon capacity. As a lower limit I prefer about a half volume of flush gas to each volume of spent gas though here again if the quality of the carbon need not be high and low heating-value gases can be readily used the flush gas could be omitted entirely. A satisfactory ratio for most conditions is between about ⅛ to ¼ volumes of flush to one volume of spent gases.

While an object of this invention is to prevent the retention of carbon in the reactor the headers may be provided with clean out plugs 64.

The initial pressure, oxygen-hydrocarbon ratio, temperature, length and diameter of tubes 16 and nature of hydrocarbon, to say nothing of the yield and quality of carbon, all appear to be inter-related. Preliminary studies indicate that at the pressures and oxygen-gas ratios herein disclosed a tube inside diameter of about an inch is satisfactory and that the length of such a tube may be at least a foot and a half long. The effect of length of the exhaust pipe has not been determined, but since its capacity is small relative to the chambers it is not thought to affect operations materially. The ratio of chamber volume to internal surface area may be between ⅝ and ⅛ inches.

That the flush gas may be of various natures is also contemplated and is apparent when it is realized that the final product gas may be put to various uses. If the product gases were to be used for the synthesis of methanol, for instance, the flush gas might be hydrogen or carbon monoxide or even carbon dioxide, if the latter is used in small amounts. If ammonia is to be produced the product gas could be rich in nitrogen.

The invention claimed is:

1. A chamber reactor for the production of carbon black by the explosion method and comprising a generally cylindrical bundle of vertical tubes; upper and lower headers for the tubes, the upper header having a generally cylindrical inner side wall and a conical bottom extending downwardly at the center, a hole being provided through said bottom for each tube, the tubes being mounted in the holes and terminating short of the inner face of said bottom to minimize the retention of carbon on said bottom; an igniter in the upper header, and an inlet pipe through the upper header side wall and substantially tangential thereto.

2. A chamber as in claim 1 the inner walls of the tubes and of the holes receiving the tubes being substantially continuous of each other so as to prevent lodging of carbon on the upper end of the tube.

HERMAN L. AMMANN.

References Cited in the file of this patent

UNITED STATES PATENTS

| Number | Name | Date |
| --- | --- | --- |
| 162,470 | Godfrey | Apr. 27, 1875 |
| 1,729,259 | Jacobus | Sept. 24, 1929 |
| 2,128,440 | Von Szeszich | Aug. 30, 1938 |
| 2,150,790 | Von Szeszich | Mar. 14, 1939 |
| 2,228,543 | Vollbrecht et al. | Jan. 14, 1941 |
| 2,232,747 | Von Szeszich et al. | Feb. 25, 1941 |
| 2,492,481 | Kaufmann et al. | Dec. 27, 1949 |
| 2,619,410 | Fross | Nov. 25, 1952 |

FOREIGN PATENTS

| Number | Country | Date |
| --- | --- | --- |
| 364,757 | Great Britain | Jan. 14, 1932 |